US008230228B2

(12) United States Patent  
Hahn et al.

(10) Patent No.: US 8,230,228 B2  
(45) Date of Patent: Jul. 24, 2012

(54) SUPPORT OF TAMPER DETECTION FOR A LOG OF RECORDS

(75) Inventors: Timothy J. Hahn, Cary, NC (US); Heather M. Hinton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/263,427

(22) Filed: Oct. 31, 2008

(65) Prior Publication Data  
US 2010/0115284 A1 May 6, 2010

(51) Int. Cl.  
*H04L 29/06* (2006.01)  
*H04L 29/00* (2006.01)

(52) U.S. Cl. ........ 713/179; 713/176; 713/189; 713/193; 713/194

(58) Field of Classification Search .................. 713/176, 713/179, 189, 193, 194; 709/223, 224  
See application file for complete search history.

(56) References Cited

U.S. PATENT DOCUMENTS

| | | | |
|---|---|---|---|
| 5,978,475 A * | 11/1999 | Schneier et al. ............ 713/177 |
| 6,725,240 B1 | 4/2004 | Asad et al. |
| 6,796,489 B2 * | 9/2004 | Slater et al. .................. 235/379 |
| 7,373,509 B2 * | 5/2008 | Aissi et al. ................... 713/168 |
| 7,409,370 B2 * | 8/2008 | Aissi .............................. 705/50 |
| 7,606,812 B2 * | 10/2009 | Perrin et al. ....................... 1/1 |
| 7,653,647 B2 * | 1/2010 | Borthakur et al. ........... 707/687 |
| 7,665,118 B2 * | 2/2010 | Mann et al. ..................... 726/1 |
| 7,757,270 B2 * | 7/2010 | Blumenau ........................ 726/1 |
| 7,770,032 B2 * | 8/2010 | Nesta et al. .................. 713/194 |
| 7,792,757 B2 * | 9/2010 | Blumenau ....................... 705/57 |
| 7,792,791 B2 * | 9/2010 | Smolen et al. ............... 707/609 |
| 7,809,699 B2 * | 10/2010 | Passmore et al. ............ 707/694 |
| 7,814,314 B2 * | 10/2010 | Gentry et al. ................ 713/158 |
| 7,849,328 B2 * | 12/2010 | Blumenau ...................... 713/189 |
| 7,958,087 B2 * | 6/2011 | Blumenau ...................... 707/610 |
| 7,958,148 B2 * | 6/2011 | Barnes et al. ................. 707/783 |
| 7,983,421 B2 * | 7/2011 | Chandrasekaran et al. .. 380/277 |
| 8,010,494 B2 * | 8/2011 | Chandrasekaran et al. .. 707/648 |
| 2003/0055809 A1 * | 3/2003 | Bhat ................................. 707/1 |
| 2005/0004899 A1 * | 1/2005 | Baldwin et al. .................. 707/3 |

(Continued)

OTHER PUBLICATIONS

Tao, Jiang; Ji-qiang, Liu; Zhen, Han; "Secure Audit Logs with Forward Integrity Message Authenticaiton Codes", 7th International Conference on Signal Processing, IEEE, Aug. 31, 2004, pp. 2655-2658.*  
Ding, Hong; Xu, Ming; "Security Audit Logs for IDS", IET International Conference on Wireless, Mobile, and Multimedia Networks, IEEE, Nov. 6-9, 2006, pp. 1-4.*  
Bruce Schneier and John Kelsey; Secure Audit Logs to Support Computer Forensics; ACM Transactions on Information and System Security; May 1999, v. 1, n. 3; Association for Computing Machinery; New York.

(Continued)

*Primary Examiner* — Carl Colin  
*Assistant Examiner* — Victor Lesniewski  
(74) *Attorney, Agent, or Firm* — Marcia L. Doubet

(57) ABSTRACT

Tamper detection of audit records comprises configuring a proxy for adding tamper evidence information to audit information by obtaining audit records from at least one audit record generating source, grouping obtained audit records into subsets of audit records and providing tamper evidence processing to the subsets utilizing a cryptographic mechanism to calculate a signature over each subset of audit records. The proxy groups the subsets such that each subset contains at least one designated carryover audit record that overlaps into a next subset so that each carryover audit record is associated with at least two signatures. As such, the proxy creates an overlapping chain of digitally signed audit records subsets. The proxy further forwards the tamper evident audit records from the tamper evidence adding proxy to a corresponding audit log storage subsystem for storage, storing the calculated signatures.

20 Claims, 8 Drawing Sheets

U.S. PATENT DOCUMENTS

| | | | |
|---|---|---|---|
| 2005/0015344 A1* | 1/2005 | Athens et al. | 705/60 |
| 2007/0112784 A1* | 5/2007 | Blumenau | 707/10 |
| 2007/0113287 A1* | 5/2007 | Blumenau et al. | 726/26 |
| 2007/0113288 A1* | 5/2007 | Blumenau | 726/26 |
| 2007/0130218 A1* | 6/2007 | Blumenau | 707/201 |
| 2007/0208685 A1* | 9/2007 | Blumenau | 707/1 |
| 2007/0283166 A1* | 12/2007 | Yami et al. | 713/187 |
| 2007/0294319 A1* | 12/2007 | Mankad et al. | 707/204 |
| 2008/0104407 A1* | 5/2008 | Horne et al. | 713/178 |
| 2009/0016534 A1* | 1/2009 | Ortiz Cornet et al. | 380/277 |
| 2009/0164377 A1* | 6/2009 | Aissi | 705/50 |
| 2010/0088522 A1* | 4/2010 | Barrus et al. | 713/181 |
| 2010/0325097 A1* | 12/2010 | Er et al. | 707/702 |

OTHER PUBLICATIONS

John Kelsey and Bruce Schneier; Minimizing Bandwidth for Remote Access to Cryptographically Protected Audit Logs; Second International Workshop on the Recent Advances in Intrusion Detection (RAID '99); Sep. 1999; Purdue IN.

Bruce Schneier and John Kelsey; Cryptographic Support for Secure Logs on Untrusted Machines; The Seventh USENIX Security Symposium Proceedings; Jan. 1998; pp. 53-62; USENIX Press; Berkeley CA.

\* cited by examiner

SUPPORT OF TAMPER DETECTION FOR A LOG OF RECORDS

BACKGROUND OF THE INVENTION

The present invention relates to systems, computer-implemented methods and computer program products for supporting and/or implementing tamper detection of data such as data that is stored in a log of audit records.

Certain computing systems are known to generate and store a log of records that are used for auditing system functions and activities. In particular, each audit record captures information related to a corresponding event of interest to the computing system. Depending upon the particular implementation, an event of interest may comprise a positive action or a negative action (or lack of action when an action is anticipated) that is to be audited. As a few illustrative examples, an audit record may capture information identifying the status and/or performance of a particular transaction or transaction type, the execution (or lack thereof) of a system process or the occurrence of an activity or state within the system or component(s) thereof. Each audit record may also capture information such as the identity of the person or process that triggered the event, a time stamp corresponding to the event and/or other relevant information associated with the occurrence of the corresponding event itself. Moreover, the organization of the audit records into a corresponding audit log typically preserves the chronological order of the recorded events.

In general terms, the log of audit records allows an administrator to determine who has done what on which system component(s), application(s), etc., and when the audit generating activity occurred. Accordingly, the value of an analysis, action or inaction based upon the information realized by a log of records is jeopardized if the log information has been tampered with, e.g., altered, modified, revised, edited, etc., whether by nefarious intent or other motive. For example, unauthorized modification, e.g., inserting or deleting records, alteration of the content of one or more audit records, etc., can impact the reliability and usability of the audit log data for diagnosing a root cause of a problem, for discovering the identity of a user responsible for particular system activities, etc.

BRIEF SUMMARY OF THE INVENTION

According to various aspects of the present invention, systems, methods and computer program products are provided for supporting tamper detection of audit log information within a computing system. Tamper detection is supported by configuring a tamper evidence adding proxy to perform tamper evidence processing that adds tamper evidence information to audit information. For example, the tamper evidence adding proxy may perform tamper evidence processing by obtaining electronically communicated audit records from at least one audit record generating source, grouping obtained audit records into subsets of audit records and providing tamper evidence processing to the subsets of audit records utilizing a cryptographic mechanism to calculate a signature over each subset of audit records.

The tamper evidence adding proxy groups the subsets such that each subset of audit records contains at least one designated carryover audit record that overlaps into a next subset of audit records. As such, each carryover audit record is associated with at least two signatures. Accordingly, the tamper evidence adding proxy creates an overlapping chain of digitally signed audit records subsets. The tamper evidence adding proxy further forwards the tamper evident audit records from the tamper evidence adding proxy to a corresponding audit log storage subsystem for storage. Moreover, the calculated signatures are stored. For example, the calculated signatures may be stored with the tamper evident audit records, or in another suitable storage location.

Tamper monitoring of tamper-evident audit records according to various aspects of the present invention may thus be performed by retrieving an audit record of interest from the audit log storage subsystem, retrieving all other audit records in an associated subset of audit records corresponding to the audit record of interest, and retrieving the digital signature associated with the retrieved subset of audit records. In this regard, there may be two or more signatures, e.g., where the audit record of interest was a carryover audit record during tamper evidence processing. Tamper detection is then performed by signing the retrieved subset of audit records, comparing the result of signing the retrieved subset with the retrieved digital signature and conveying whether tampering has been evidenced based upon the comparison.

DETAILED DESCRIPTION OF THE INVENTION

Figure 1:
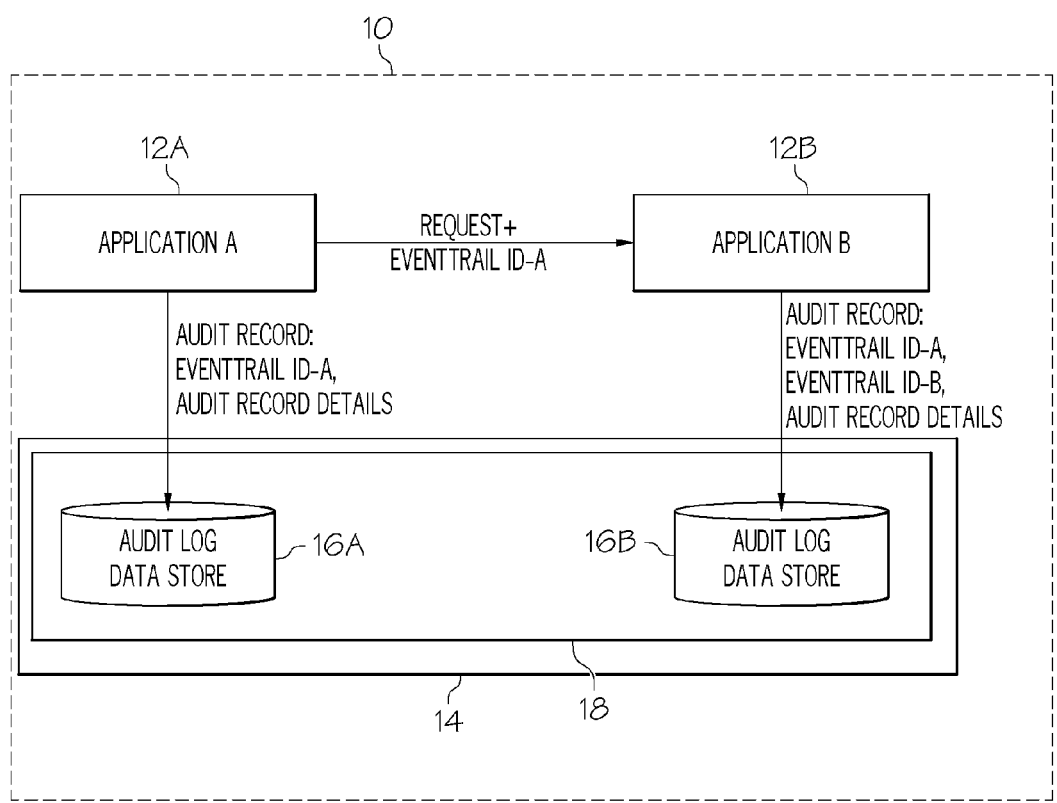
FIG. 1 is a block diagram illustrating the flow of audit information from audit record generating sources to a corresponding audit log data store according to various aspects of the present invention.

According to various aspects of the present invention, information such as logs of audit records are stored in such a way that the data contained by the audit records cannot be modified without also creating the ability to detect that such modification has occurred. Thus, for example, an entity such as a person engaging in computer activities that trigger the creation of audit records is unable to tamper with any records of their actions in a manner that cannot be subsequently detected with regard to audit records that have been logged according to various aspects of the present invention as described more fully herein. However, legitimate modifications to the audit records may still be performed as further set out in greater detail herein.

In conventional computing environments, many system components that transmit audit log information natively provide audit information in an unsecured manner. In this regard, file access permissions serve as the first line of defense against tampering and/or changing of this log information in many computing environments. Thus, such unsecured systems may transmit raw audit log data, leaving it up to some additional system component to take responsibility for storing the audit records in a secure fashion if security measures are required.

In conventional computing environments, certain users/entities that perform activities that trigger audit logging, such as network administrators, are often capable of accessing log information on the systems upon which they are working. Accordingly, such administrators may be able to circumvent conventional file access permission and protection schemes. However, according to various aspects of the present invention, tamper evidence extends beyond normal file access permissions and protections of conventional computer systems.

A cryptographic mechanism such as a digital signature may be utilized to detect whether information has been changed by an entity other than the entity/person/application that created the information or that otherwise has permission to alter the information. An exemplary signature may comprise a Hash-Based Message Authentication Code (HMAC) or some form of public/private key based signature algorithm, which is used to sign the data for which tamper detection is to be implemented. By using such cryptographic mechanisms, a user may still be able to implement subsequent changes to the signed data. However, any such change will be detected when the (now modified) signature fails to match the original signature of the data.

For example, an approach to secure audit logs is by signing each audit record with a shared secret and by evolving this shared secret based on the cryptographic digest of the "previous" shared secret, thus building up a chain based on the initial key "tied" to the initial audit record.

As an illustrative example, a system opening a new audit log may first establish a shared secret, such as with a trusted third party. After each audit record is generated, the current shared secret is evolved such that the current shared secret is completely replaced by a new shared secret. The new shared secret is computed as the cryptographic digest of the previous shared secret. Moreover, each audit record is encrypted under a key which is derived from the current value of the previous shared secret, and then the encrypted record is protected using a Message Authentication Code (MAC) keyed with the previous shared secret. Records are then linked using a hash chain. Thus, forward secrecy may be obtained based on the linking of each record to the next sequent record, so that all records are linked together.

The approach of evolving a shared secret based on the cryptographic digests of the "previous" shared secret requires that audit records are never modified after they are "cut". However, many computing systems are capable of generating significant amounts of data under their individual system audit policies. For example, in typical operating environments, audit information does not originate from a single source. Rather, audit records are typically produced by multiple components of the associated system. As such, there may be a need to reconcile audit records from different sources as part of the process of building and managing an overall system-wide storage of audit records.

Accordingly, reconciliation and pruning of audit data is often required. For example, a full set of audit data may be kept for a short period of time. However, when storing audit data for long term purposes, the audit data is often reconciled/pruned to remove data that is not required or deemed to be important for anticipated analysis activities such as for troubleshooting purposes, etc. Also, in some instances, it may be necessary or desired to reduce the available audit log information down to some minimum requirement, e.g., to that required for legal/regulatory purposes.

The calculations required to implement a digital signature such as HMAC over an entire log is likely to be too costly to deploy in practice. Moreover, even if a system was capable of implementing the necessary calculations, such digital signatures over the entire log are impractical because this type of forward secrecy links all records together. Accordingly, the entire set of audit data, from beginning to end, must be stored in perpetuity. However, as noted above, it is not always practical or desirable to store the entire original audit log data for long periods of time.

According to various aspects of the present invention, cryptographic signature mechanisms are utilized to provide tamper-evidence of information such as audit logs. Moreover, tamper-evident log information may be built in a manner that preserves forward secrecy, while providing a practical approach to audit log pruning/reconciliation. Additionally, tamper evidence capabilities may be integrated into existing architectures with minimal impact on existing systems, e.g., that typically do not transmit secure audit records. Approaches to audit log tamper detection may be implemented without incurring the overhead of re-calculating a digital signature, e.g., an HMAC, over the entire log whenever the log is legitimately modified. In this regard, the computation required to maintain a tamper-evident log of information is reduced because a signature calculation across the entire log is not necessary. Moreover, a log that has been made tamper evident according to various aspects of the present invention set out in further detail herein may be modified by an entity that is intended or otherwise authorized to modify the log.

According to further aspects of the present invention, tamper evidence detection/resistance is provided by enhancing audit records using a combination of signatures that are collectively computed over the log of information. The combination of signatures is constructed so that multiple signatures overlap in a corresponding set of data over which those signatures are calculated. As such, when one signature calculation ends, another signature calculation will have already been started. Accordingly, changes to the data when one signature calculation is not "in effect" will be detectable because another overlapping signature calculation will be "in effect". Moreover, by calculating a signature over a subset of the entire log, sections of the log can be modified, e.g., records may be updated, removed, inserted, edited, concatenated, split, aggregated, etc., so long as such modification is performed by an entity that is able to correctly calculate the corresponding signature.

The capability of re-calculating signatures "in the area" of the audit file as described more fully herein may allow, for example, the use of the overlapping signatures to be applied to any file format. In this regard, consideration of the subsets of information covered by each of the signatures may be required. Moreover, care may be required to ensure that signatures overlap as necessary to cover the desired contents of the file. Still further, this "overlapping" signature approach may also allow the consolidation of multiple individual audit logs into a single, consolidated audit log environment, thus representing an overall tamper evident system.

With reference generally to FIG. 1, an illustrative computing environment 10 includes one or more audit record generating sources 12. For example, as shown, there are two audit record generating sources including Application A, also designated 12A and Application B, also designated 12B that each report audit records to a corresponding audit logger 14. The audit logger 14 includes one or more data stores designated as 16A and 16B respectively. Although shown for purposes of clarity as separate data stores 16A, 16B, in practice, the data stores 16A, 16B may be stored in any practical manner, including as separate resources or the data may be commingled into a single source.

Although only the audit record generating sources 12A, 12B and the audit log data logger 14 are illustrated for purposes of clarity of discussion, the computing environment 10 may comprise numerous other features, depending for example, upon the actual implementation of the computing environment 10. For example, the computing environment 10 may comprise a single processing device or a plurality of hardware and/or software processing devices that are linked together by a network.

Typical processing devices may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices. The processing devices may also comprise software, including applications that interact with various databases, spreadsheets, structured documents, unstructured documents and/or other files containing information.

The computing environment 10 may also use a network to provide communications links between various processing devices and may be supported by networking components that interconnect the processing devices, including for example, routers, hubs, firewalls, network interfaces wired or wireless communications links and corresponding interconnections. Moreover, the network may comprise one or more intranets, extranets, local area networks (LAN), wide area networks (WAN), wireless networks (WIFI), the internet, including the world wide web, and/or other arrangements for enabling communication between the processing devices, in either real time or otherwise, e.g., via time shifting, batch processing, etc.

As an alternative to a distributed computing system, it is also possible to practice various aspects of the present invention within a single processing device, such as a server computer. In this regard, the computing environment 10 may be contained to a single physical processing device.

Although the audit record generating sources 12 are shown for purposes of illustration as applications, in practice, the audit record generating sources 12 may comprise any aspect of the computing environment 10 that generates log records or event messages that are utilized in the creation of audit records. Thus, as used herein, audit record generating sources may include software applications, event logs, audit services, hardware auditing components such as event logging devices or adapters, a kernel module, etc.

Application A and Application B are each capable of conveying audit records. Each audit record typically contains information that may either pertain to, or be generated as a result of the execution of some function, e.g., a system activity, business process, or from a lack of activity, e.g., a failure of a component to respond when a response was expected, etc. Exemplary audit record information may include, for example, the name of the auditable event, the success or failure of the event and any additional event-specific information that is relevant to auditing.

As used herein, the term "record" should not be construed so as to be limited to a particular required data format or data structure. Rather, the term "record" is used herein in a broad sense to mean a collection of information to be recorded. Thus, for example, a record may comprise an arbitrary stream of bytes for purposes of discussion herein. As an illustrative example, assume that an audit log contains a plurality of audit records, designated herein as Record[0] . . . Record[N], where N is any integer. From this perspective, the audit log may be conceptualized as a sequential concatenation of the audit records Record[i]. As such, the conceptualized sequential stream of bytes herein may be extended to other streams of data, e.g., wire protocol, data files, etc.

The various generated audit records are collected by the system audit logger 14 and corresponding audit log data stores 16A, 16B. The assembly of audit records in a suitable data store allows the creation of an audit trail or audit log, which is typically preserved as a chronological sequence of audit records. As such, audit records may be reconstructed to determine an event or sequence of events.

For purposes of clarity of discussion, in the illustrative example, Application A is shown as generating an audit record that includes an event trail identification (EventTrailID-A) as well as audit record details. Application A further transmits a request to Application B that includes the corresponding event trail identification (EventTrailID-A) in this example. Application B also generates an audit record. The audit record generated by Application B includes the received event trail identification from Application A (EventTrailID-A) as well as its own event trail identification (EventTrailID-B) and associated audit record details. Thus, in the illustrative example, Application A and Application B each emit their own audit records to a suitable process or storage, e.g., the system audit logger 14 as illustrated. The audit records received by the audit logger are correlated by an event trail ID that is propagated across components. In this instance, the event trail ID is propagated from Application A to Application B. However, correlation of event records is not required.

According to aspects of the present invention, the signature calculating capabilities described more fully herein may be leveraged to add tamper evidence functionality onto existing audit log services by implementing the necessary tamper evidence administration in a proxy-like function. For example, tamper-evident logs may be constructed by utilizing at least one tamper evidence adding proxy (also referred to herein as a shim) as an interface to at least one associated component of an audit log processing system. In this regard, each proxy implements the necessary functionality to provide tamper evidence detection/resistance to corresponding audit log information by enhancing audit records using the combination of signatures described more fully herein.

In an illustrative implementation, the signature processing capabilities of the tamper evidence adding proxy can wrapper one or more components of an existing audit log processing system, e.g., associated audit log(s) and/or audit log interface(s). Under this illustrative approach, the proxy-like wrapper is implemented such that existing applications will not "break", e.g., become dysfunctional, crash or otherwise fail to execute. Moreover, the wrapper may be implemented such that changes to existing audit log database(s) are not required. Moreover, when implementing permissible log record modifications, e.g., edits, deletions, insertions, etc., the only signatures that need be re-calculated are those "in the area" of the audit log modification. For example, signatures may be considered "in the area" if such signatures are associated with a subset of audit data over which the signature calculation extends, e.g., that may extend prior to and/or after the modified information in the log.

As illustrated in FIG. 1, a tamper evidence adding proxy 18 is provided as a wrapper that wraps the audit logger 14 to provide tamper evidence to the data stored in the audit log data stores 16A, 16B. Tamper evidence techniques and capabilities are described more fully herein.

Figure 2:
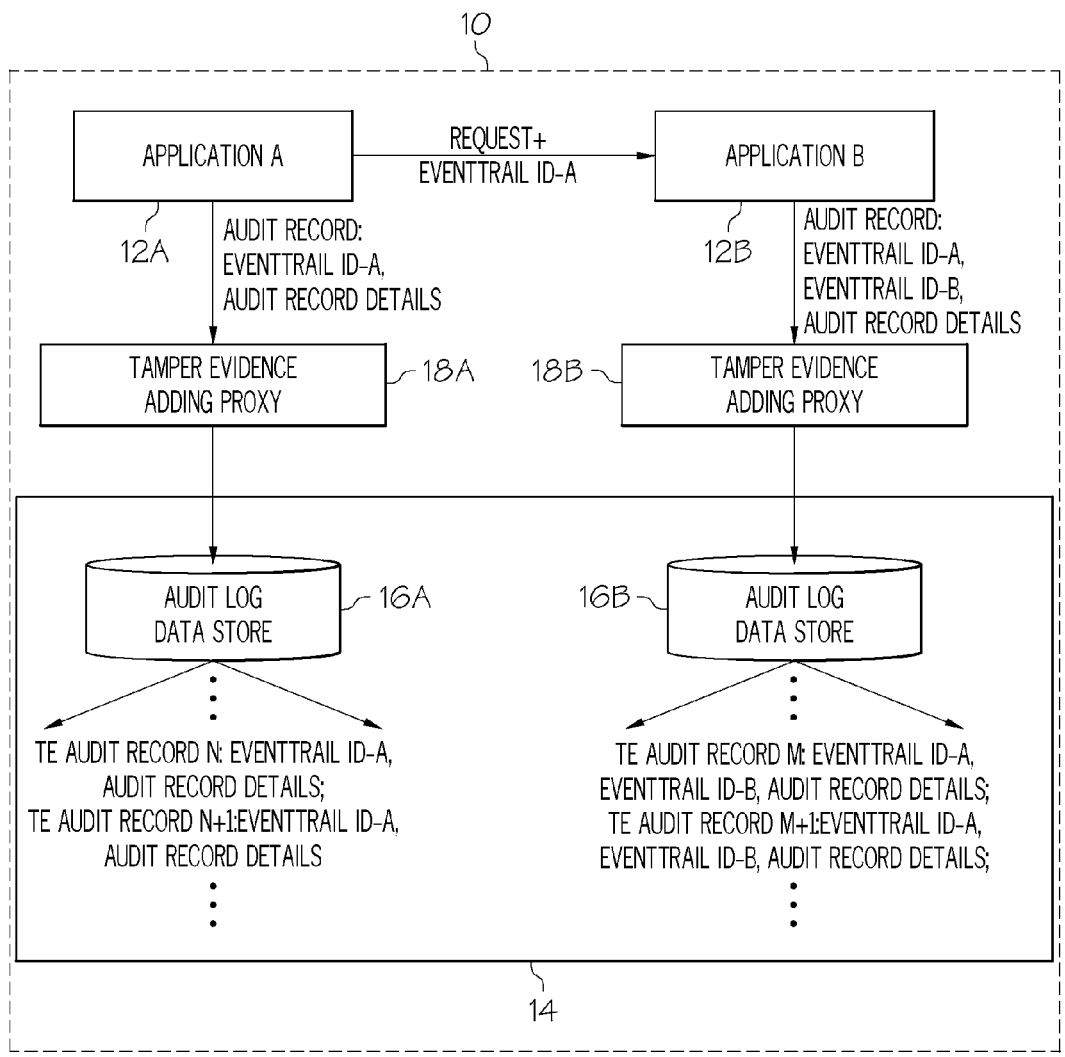
FIG. 2 is a block diagram illustrating the flow of audit information from audit record generating sources to a corresponding audit log data store according to further aspects of the present invention.

Referring to FIG. 2, according to various aspects of the present invention, the computing environment 10 may also include a tamper evidence adding proxy-like function 18 that is implemented as a first tamper evidence adding proxy 18A, e.g., a wrapper that provides tamper evidence to the log records generated by Application A, and a second tamper evidence adding proxy 18B, e.g., a wrapper that provides tamper evidence to the log records generated by Application B.

In the illustrative example, the first tamper evidence adding proxy 18A provides a tamper evidence capability to the audit records generated by Application A. Thus, for example, the first tamper evidence adding proxy converts an audit record associated with Application A to a tamper evident (TE) audit record having an event trail ID of EventTrailID-A.

Similarly, the second tamper evidence adding proxy 18B coverts an audit record associated with Application B to a tamper evident audit record having an event trail ID of Event-TrailID-A-EventTrailID-B due to the correlation of Application A to Application B.

In the illustrative example, the audit logs associated with Application A and Application B are tamper evident. Moreover, the audit logs can be reconciled based upon the shared event trail ID. Moreover, when audit log reconciliation occurs, it is possible to insert information into the logs in a tamper-evidence preserving manner.

In particular, audit records communicated from Application A are obtained by the tamper evidence adding proxy 18A. As illustrated, the tamper evidence adding proxy 18A modifies each obtained audit record to create a corresponding tamper evident audit record, which is communicated to the system audit logger 14 and corresponding audit log data store 16A. The first audit log data store 16A stores at least one log of tamper evident (TE) audit records, illustrated as TE Audit Record n: EventTrail ID-A, Audit Record Details . . . TE Audit Record n+1:EventTrail ID-A, Audit Record Details . . . .

The tamper evidence adding proxy 18A further implements functionality to provide tamper resistance to the audit log stored in the audit log data store 16A using a combination of signatures that are constructed so that multiple signatures overlap in the set of data over which those signatures are calculated as will be described in greater detail herein.

Similarly, audit records communicated from Application B are obtained by the tamper evidence adding proxy 18B. The tamper evidence adding proxy 18B modifies each obtained audit record to create a corresponding tamper evident audit record, which is communicated to the system audit logger 14 and corresponding audit log data store 16B. The second audit log data store 16B stores at least one log of tamper evident (TE) audit records, illustrated as TE Audit Record m: EventTrail ID-A, EventTrail ID-B, Audit Record Details; TE Audit Record m+1:EventTrail ID-A, EventTrail ID-B, Audit Record Details . . . .

The tamper evidence adding proxy 18B further implements functionality to provide tamper resistance to the audit log stored in the audit log data store 16B using a combination of signatures that are constructed so that multiple signatures overlap in the set of data over which those signatures are calculated as will be described in greater detail herein.

Figure 3:
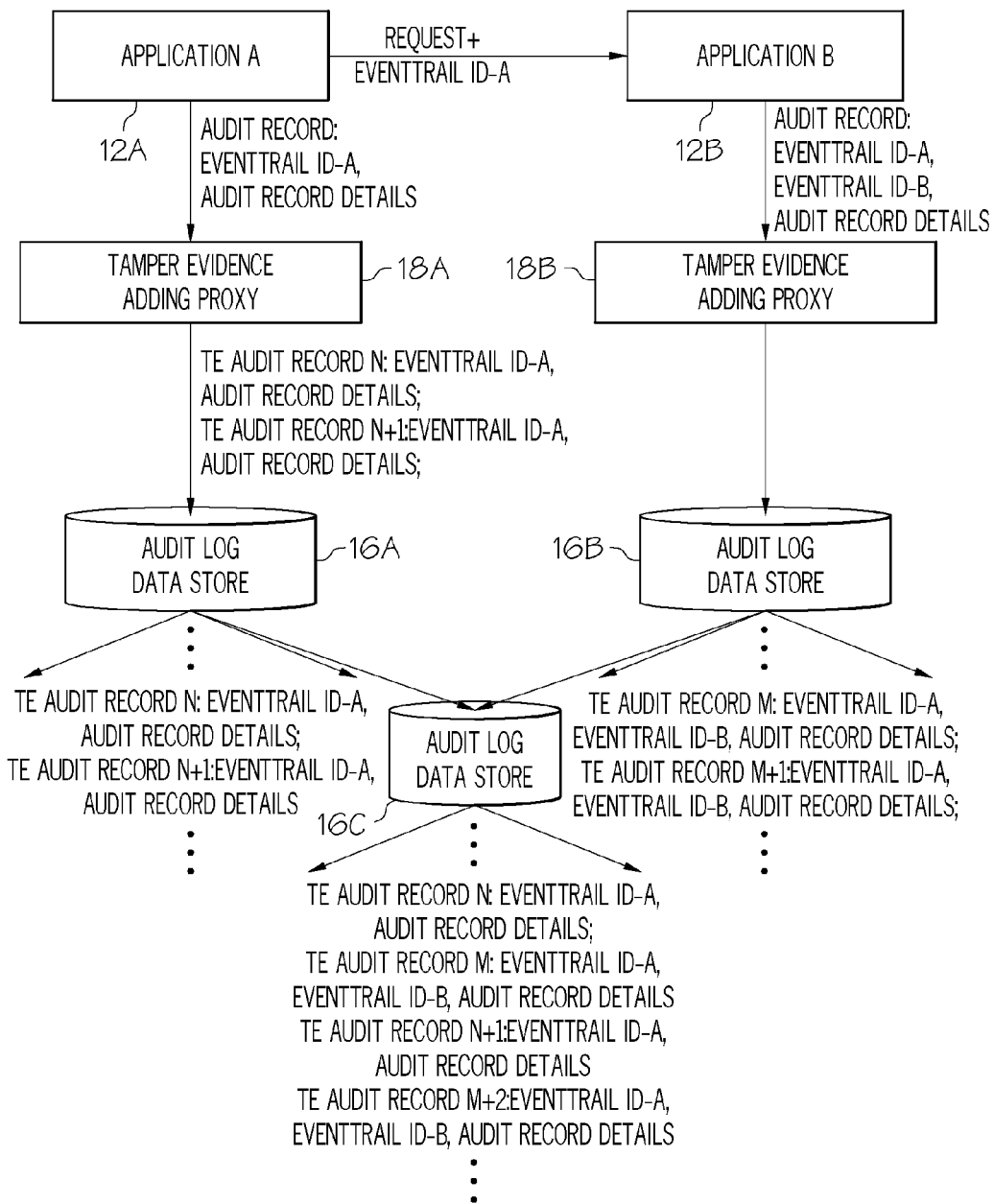
FIG. 3 is a block diagram illustrating the flow of audit information from audit record generating sources to a corresponding audit log data store according to still further aspects of the present invention.

Referring to FIG. 3, the routing of audit records from Application A through the first tamper evidence adding proxy 18A and from the first tamper evidence adding proxy 18A to the first audit log data store 16A is analogous to that shown in FIG. 2. Similarly, the routing of audit records from Application B through the second tamper evidence adding proxy 18B and from the second tamper evidence adding proxy 18B to the second audit log data store 16B is analogous to that shown in FIG. 2. However, as further illustrated, the content of the first audit log data store 16A is commingled with the content of the second audit log data store 16B to form a third data set, illustrated for purposes of clarity of discussion in a third data store 16C. Moreover, this example illustrates that the data can be easily commingled and pruned, while remaining tamper evident. For example, in the illustrative example, a determination was made that the tamper evident audit record m+1 was not long term valuable, so it was purged from the consolidated audit log in the third data store 16C. For example, the tamper evident audit record m+1 may be determined to be invaluable from a compliance, governance or evidentiary point of view.

Tamper Evidence Adding Proxy Processing:

According to various aspects of the present invention, methods are provided for detecting tamper evidence for a set of records. Tamper evidence detection may reveal for example, whether any one or more tamper evident records have been tampered with, e.g., replaced, deleted, added, edited, or otherwise modified from an original, untampered form. An exemplary approach for implementing tamper evidence features of audit records by the tamper evidence adding proxies 18A, 18B comprises the use of sliding windows for processing signatures across subsets of audit records.

Figure 4:
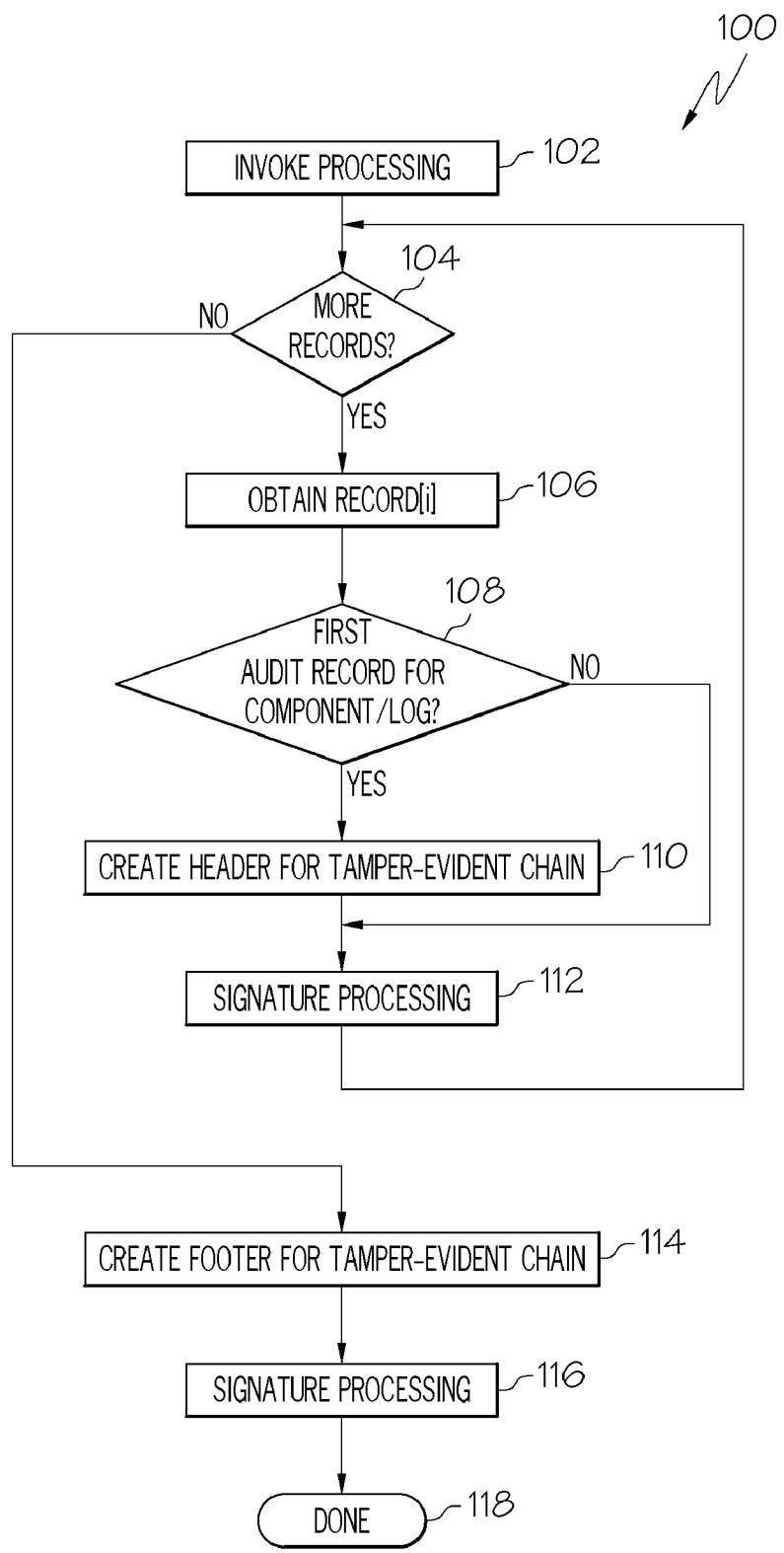
FIG. 4 is a flow chart illustrating a method of tamper evident encoding of audit records according to various aspects of the present invention.

With reference to FIG. 4, a flow chart illustrates an exemplary method 100 of generating a tamper evident log record using a "sliding window". The method may be implemented, for example, as part of the processing performed by the tamper evidence adding proxies 18, 18A, 18B described herein with reference to FIGS. 1, 2 and/or 3. A process is invoked at 102 to log an audit record. For example, a tamper evidence adding proxy may receive a request to log an audit record at 102. The request need not be an explicit request and may thus be implicit. For example, an event may trigger the tamper evidence adding proxy to invoke the processing described more fully herein, each time a log record is issued by the logging entity or other component that creates the audit record. As another example, the proxy may be invoked to monitor one or more audit record generating sources.

The tamper evidence adding proxy performs a check at 104 to determine whether audit records are available for processing. If at least one audit record is available for processing, the tamper evidence adding proxy obtains an audit record at 106. For example, the audit record may be intercepted by the tamper evidence adding proxy as the audit record is en route to a corresponding destination, such as an audit log data store. The tamper evidence adding proxy may alternatively receive, fetch, discover or otherwise obtain the audit record for tamper evidence processing. For purposes of clarity of discussion herein, the obtained audit record may be described as Record [received], where [received] corresponds to an index that relates to a quantity of received records.

The manner in which the audit records are obtained will likely depend upon the implementation and where in the system/what component(s) of the system are wrapped by the tamper evidence adding proxy. In this regard, the tamper evidence adding proxy may obtain the audit records either from one or more event generating source(s) or in a data transmission stream between an event generating source and corresponding destination. As another illustrative example, the proxy may detect the presence of one or more audit records. Thus, for example, a set of log records could already exist. The algorithm described more fully herein could be run through for each of the log records in that set, in order.

A check may be performed at 108 to determine whether the received audit record is the "first-ever" audit record for the associated component/log. The determination of "first-ever" may be based upon one or more predetermined criteria. If a determination is made by the check at 106 that the received audit record is a "first ever" audit record according to the optional predetermined criteria, then a header is created at 110 for a corresponding tamper-evident chain. Exemplary header information is described in greater detail below. If a decision is made that the audit record obtained at 104 is not a first record of a corresponding chain, then it is assumed that a chain exists, and processing continues.

After creating a header record at 110, or if the check at 108 indicated that the currently selected record was not a first record, signature processing is performed at 112. Signature processing will be described in greater detail herein. Once signature processing is complete at 112, the flow loops back to check for more audit records at 104 that are associated with the current "window", i.e., current "chain". If all of the records associated with the current chain have been processed, then a footer record is created for the current chain at 114, signature processing of the footer is performed at 116 and processing concludes at 118.

According to aspects of the present invention, to guard against records being added, e.g., before Record[0] or after Record[N], data may be added to the file/log to signify the beginning and/or ending of the chain, i.e., log subset. For example, in the method 100, both a header record and a footer record are created to define the boundaries of a corresponding chain. In this regard, signature calculations are performed over both of the header and footer markers.

Moreover, the method 100 may be repeated by "sliding" the window and thus the subset of log records that are processed to become tamper-evident. In this regard, the window is slid such that the new chain of audit records being processed contains at least one audit record from the previous chain, examples of which are provided in greater detail herein.

As noted above, the audit record RECORD[i] may be intercepted, e.g., on its way into the audit log, such as before it is written to the log but once it is in the audit logging system. In this regard, tamper evidence is provided by enabling the tamper evidence adding proxies 18, 18A, 18B to implement signature processing at 110 such as by using cryptographic signature mechanisms to provide tamper-evidence of information to corresponding audit records. Moreover, as noted above, a combination of signatures are collectively computed over the log of information. The combination of signatures is constructed so that multiple signatures overlap in a corresponding set of data over which those signatures are calculated. In this regard, signatures may be computed for individual audit records and for subsets of audit records, such as using the windowing techniques described more fully herein. After processing is complete, the tamper evident record (TE record as shown in FIGS. 1-3) is forwarded to the corresponding data store 16 for suitable storage, processing, archival, etc. as described more fully herein with reference to FIGS. 1-3.

Illustrative Example 1

By way of illustration and not by way of limitation, support of tamper detection of audit log information within a computing system may be provided by configuring a tamper evidence adding proxy for adding tamper evidence information to audit information.

As described more fully herein, the tamper evidence adding proxy obtains electronically communicated audit records from at least one audit record generating source and groups the obtained audit records into subsets of audit records. The tamper evidence adding proxy provides tamper evidence processing to the subsets of audit records utilizing a cryptographic mechanism to calculate a cryptographic signature over each subset of audit records using a corresponding signature definition so as to create an overlapping chain of digitally signed audit records. Each subset of audit records contains at least one designated "carryover" audit record that overlaps into a next subset such that each carryover audit record is associated with at least two signatures. A signature may also be computed over each individual audit record so that tamper evidence is facilitated on a "per record" basis and a "per subset" basis. The tamper evident audit records are forwarded from the tamper evidence adding proxy to a corresponding audit log storage subsystem for storage and the calculated signatures are suitably stored.

As a simplified example of the above, assume that a sliding window computation is defined by a subset of audit records that is three records long, having a single record "carryover" thus defining one record of overlap. In the nomenclature below, HWindow1 corresponds to a computation of a first signature across a first subset of audit records associated with a first window, Hwindow2 corresponds to a computation of a second signature across a second subset of audit records associated with a second window, Record[i] corresponds to the $i^{th}$ obtained audit record, HMAC(Record[i]) corresponds to an exemplary signature mechanism to compute a signature of the $i^{th}$ obtained audit record used to derive the tamper evident version of the corresponding audit record.

In general, tamper evidence processing may be implemented by the shorthand flow as follows:

Generate initial header record, designated Record[0].
Compute HMAC(Record[0])
Accumulate Record[0] into subset of Window1
    e.g., Compute HWindow1=HMAC(Record[0])
    - preserve in memory
Write Record[0], HMAC(Record[0]) to the audit log,
    e.g., as HRecord[0]=Record[0]&HMAC(Record[0])
Obtain Record[1]
Compute HMAC(Record[1])
Accumulate Record[1] into subset of Window1
    e.g., Compute HWindow1=HMAC(Record[0], Record[1])
    - preserve in memory
Write Record[1], HMAC(Record[1]) to the audit log
    e.g., as HRecord[1]=Record[1]&HMAC(Record[1])
Obtain Record[2]
Compute HMAC Record[2]
Accumulate Record[2] into subset of Window1
Compute HWindow1=HMAC(Record[0] + Record[1] + Record[2])
Accumulate Record[2] into subset of Window2
    e.g., Compute HWindow2=HMAC(Record[2])
    - preserve in memory
Write Record[2], HMAC Record[2], HWindow1 to the audit log
    e.g., as HRecord[2]=Record[2]&HMAC(Record[2])&HWindow1
Reset HWindow1 to an empty subset
Obtain Record[3]
Compute HMAC(Record[3])
Accumulate Record[3] into subset of Window2

```
e.g., Compute HWindow2=HMAC(Record[2] + Record[3])
    - preserve in memory
Write Record[3], HMAC Record[3]
    e.g., as HRecord[3]=Record[3]&HMAC(Record[3])
Obtain Record[4]
Compute HMAC Record[4]
Accumulate Record[4] into subset of Window2
Compute HWindow2=HMAC(Record[2] + Record[3] + Record[4])
Accumulate Record[4] into subset of Window1
    e.g., Compute HWindow1=HMAC(Record[4])
    - preserve in memory
Write Record[4], HMAC Record[4], HWindow2 to the audit log
    e.g., as HRecord[4]=Record[4]&HMAC(Record[4])&HWindow2
Reset HWindow2 to an empty subset
... Continue in an iterative manner...
```

Thus, in this illustrative example, there are to be two separate windows (Window1 and Window2), each three records long with one record overlap (a one carryover audit record) for creating a tamper-evident chain.

An initialization process may be implemented to generate an initialization record. For example, an initial record, designated as Record[0], may be initialized to serve as the header of the corresponding tamper-evident chain to designate a "top of file" or "top of chain" indicator.

The tamper evidence adding proxy then utilizes a cryptographic mechanism to create a signature of the header record. For example, a signature of the header record, may be computed based upon the header record, e.g., Record[0] in the current example, and a hash calculation encryption using some shared secret key (HMAC) of the current record. The proxy thus computes the HMAC of the created header record in this example to derive HMAC(Record[0]).

The header and its signature are written to the audit log. For example, a new tamper evident audit record may be created, designated HRecord[0]. In this regard, a letter designation "H" has been added in front of the designation "Record" to indicate that the record is transformed into a tamper evident format e.g., in a manner that is analogous to the "TE" designation applied to the flow diagrams of FIGS. 1-3.

In an illustrative example, HRecord[0]=Record[0] &HMAC(Record[0]). That is, HRecord[0] is determined by calculating HMAC(Record[0]) and by appending the calculated result to the determined initial record Record[0].

The first window HWindow1 is also updated. At this state, Record[0] is accumulated into the current subset of audit records associated with HWindow1. Depending upon how the tamper evidence adding proxy is implemented, it may be necessary to temporarily store Record[0] in memory accessible by the tamper evidence adding proxy. The process may alternatively wait until a first record Record[1] is received by the tamper evidence adding proxy before setting up the header record.

The tamper evidence adding proxy obtains the first record, designated Record[1], which is digitally signed, e.g., using HMAC(Record[1]). The first record and its signature (Record[1], HMAC(Record[1])) are written to the audit log, e.g., as tamper evident HRecord[1]. Tamper evident HRecord[1] may be determined by calculating HMAC(Record[1]) and by appending the calculated result to the determined value of Record[1], e.g., as record HRecord[1]=Record[1]&HMAC (Record[1]). Record[1] is accumulated into the subset associated with Window1.

The tamper evidence adding proxy then obtains the second record, designated Record[2], which is digitally signed, e.g., using HMAC(Record[2]). Record[2] is also accumulated into the subset associated with the first window. At this time, the subset corresponding to the first window is full because it was previously specified that each window is three audit records in length.

As noted above, each subset of audit records also contains at least one designated carryover audit record that overlaps into a next subset such that each carryover audit record is associated with at least two signatures. In this example, the second record (Record[2]) is a designated carryover triggering the start of the next window. As such, Record[2] is also the first entry accumulated into the subset associated with the second window (in this example). A cryptographic mechanism is used to sign the records aggregated into the first window, e.g., HWindow1=HMAC(Record[0]+Record[1]+ Record[2]). The second record, its signature and the signed first window are written to the audit log(Record[2], HRecord [2], HWindow1), e.g., as HRecord[2], Hwindow[1] where HRecord[2]=Record[2]&HMAC(Record[2]). Also, the first window is reset so that it can begin to accumulate a new subset of audit records.

The above approach provides "bootstrapping" of the secure HMAC chaining and prevents a semi-privileged attacker from re-writing the entire contents of the corresponding audit log by re-writing Record[0] and thus potentially modifying Record[i], 0<i<N, with valid HMAC but invalid Record[i]. In other words, "bootstrapping" refers to the insertion of the "top of file" marker (Record[0] and the calculation of both the HMAC of that top of file marker, HMAC(Record [0]) and also calculating HWindow[1] over Record[0] as well.

The tamper evidence adding proxy then obtains the third record, designated Record[3], which is digitally signed, e.g., using HMAC(HRecord[3]). The third record and its signature (Record[3], HRecord[3]) are written to the audit log, as tamper evident HRecord[3]=Record[3]&HMAC(Record [3]). Additionally, Record[3] is accumulated into the subset associated with the second window.

The tamper evidence adding proxy then obtains the fourth record, designated Record[4], which is digitally signed, e.g., using HMAC(HRecord[4]). Record[4] is also accumulated into the subset associated with the second window. Moreover, since one record of overlap was specified in this example, Record[4] is a designated carryover audit record that overlaps into a next subset accumulated for the first window (in this example). As such, the fourth record is also the first entry accumulated into the new subset associated with the first window. A cryptographic mechanism is then used to sign the records aggregated into the second window, e.g., HWindow2=HMAC(Record[2]+Record[3]+Record[4]). The fourth record, its signature and the signed second window are written to the audit log(Record[4], HRecord[4], HWindow2)), e.g., as HRecord[4], Hwindow[2] where HRecord [4]=Record[4]&HMAC(Record[4]). Also, the second window is reset so that it can begin to accumulate a new subset of audit records once triggered by the carryover associated with the first window.

The above process continues in an iterative manner analogous to that described above. In this example, each subset of audit records also contains at least one non-overlapping audit record. For example, the first record (Record[1]) was accumulated into the first subset associated with the first window, but was not accumulated into a subset associated with the second window. Likewise, the third record (Record[3]) was accumulated into a subset associated with the second window, but was not accumulated into a subset associated with the first window. Other implementations are also possible within the spirit of the various aspects of the present invention.

In the exemplary description above, the window length was set to three audit records in length. However, as noted in greater detail herein, the window size can be variable, and set to more than three records as long as there is at least one non-overlapping record. According to further aspects of the present invention, window sizes can be defined for a configurable number of records to reflect at least one predetermined condition, e.g., one or more performance requirement(s) of the system. As an illustrative example, a window size may be determined based upon a desired throughput rate. For example, a particular implementation may need to generate tamper-proof audit records with a relatively "high throughput rate", such as where many records are produced (or anticipated to be produced) by the audit source, which must be quickly made tamperproof and stored in a corresponding audit log data store. This relatively "high throughput rate" may indicate a longer window length, e.g., so that the cost of bootstrapping can be amortized over (relatively) more audit records.

As another illustrative example, a desired or perceived need to implement a lot of retrieval operations, e.g., to retrieve stored audit records for analysis, may indicate the need for a shorter window length, e.g., to reduce the overhead of retrieving a large set of audit records for tamper-evidence validation described more fully herein. This window size can be configured in advance or can be dynamically determined by the audit proxy in response to current creation and modification requirements on the tamperproof audit records.

In practice, the window size can encompass any number of records, e.g., 2 or more. Any number of windows may be utilized, e.g., two or more, and any number of carryover records may be specified to define an overlap to a corresponding adjacent window, e.g., one or more and each chain may optionally include a header record and/or footer record that may be created by the corresponding tamper evidence adding proxy. Moreover, the variables may be the same or different for each window. Still further, the cryptographic mechanism utilized to sign the records aggregated into each window may be independently determined. Also, the signatures used to compute each chain may be stored with the (now) tamper evident audit records, or the signatures may be stored in other practical storage locations.

Figure 5:
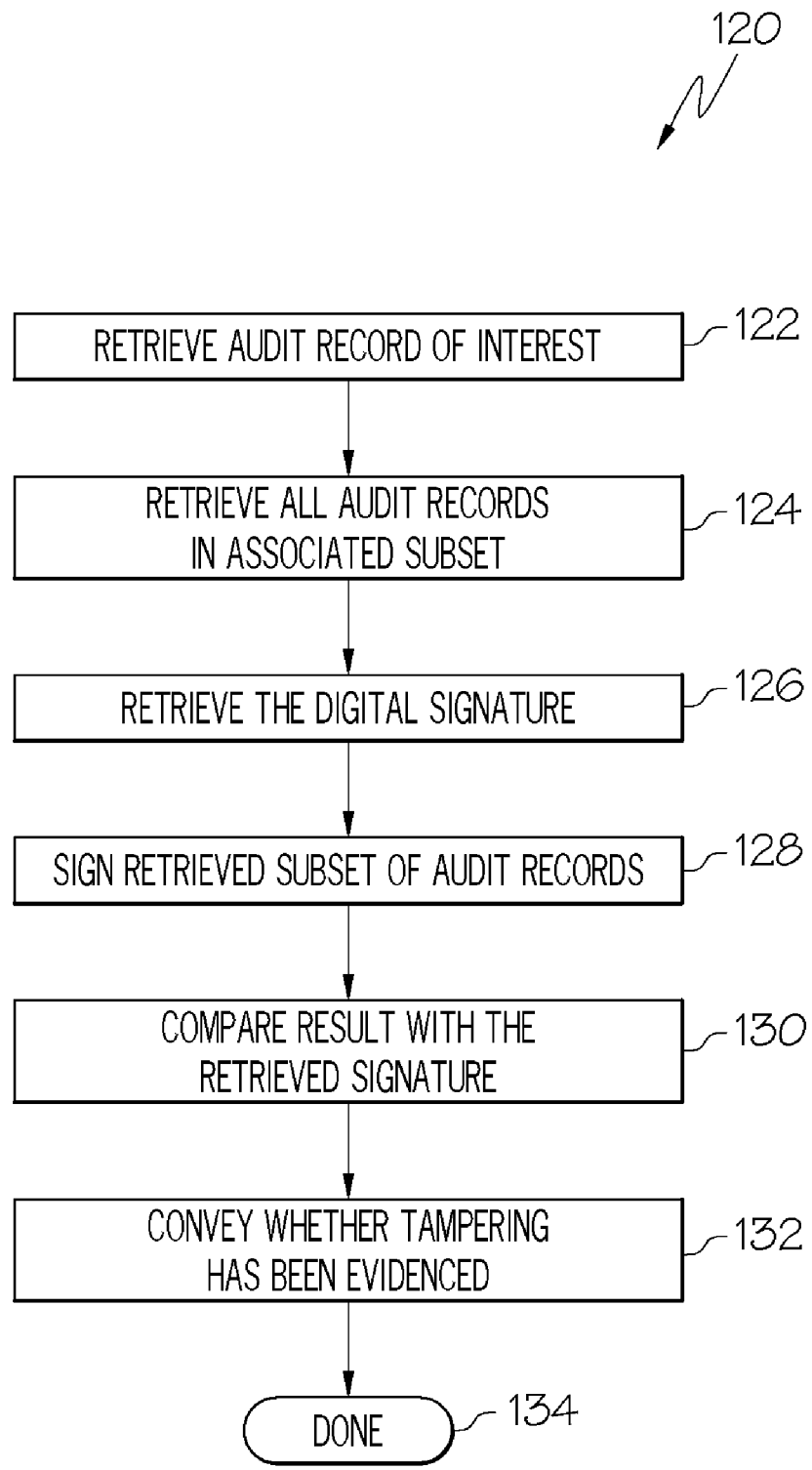
FIG. 5 is a flow chart illustrating a method of monitoring for tamper evidence using tamper evident encoded information according to various aspects of the present invention.

Monitoring for Tamper Evidence:

With reference to FIG. 5, an exemplary approach 120 is provided for monitoring for tamper evidence given the tamper evident processing described above. Tamper evidence monitoring may be performed by retrieving an audit record of interest at 122, e.g., from the audit log storage subsystem, retrieving all audit records in an associated subset of audit records corresponding to the audit record of interest at 124 and retrieving the digital signature associated with the retrieved subset of audit records at 126.

The tamper monitoring function then may determine whether the record of interest has been tampered with by signing the retrieved subset of audit records at 128, e.g., using a signature definition corresponding to the cryptographic mechanism used to add tamper evidence to the subset of audit records, comparing the result of signing the retrieved subset with the retrieved digital signature at 130 and conveying whether tampering has been evidenced based upon the comparison at 132. The conveyance will likely depend upon the specific implementation of the monitoring function. For example, the conveyance may comprise a notification to a network administrator or other information technology specialist. Other forms of conveyance may also be implemented. The approach concludes at 134.

Updating an Audit Record:

Similarly, an audit record can be updated, deleted, pruned, etc. For example, edits may be performed by retrieving an audit record of interest, e.g., from the audit log storage subsystem and by retrieving all audit records in an associated subset of audit records corresponding to the audit record of interest, as described with reference to FIG. 5. It may also be desirable to retrieve the digital signature associated with the retrieved subset of audit records, if the application dictates. The audit record of interest is then edited and the results are re-stored back to the audit log data store. For example, assume that HRecord[i] is the audit record of interest and Record[i+m] is the last record of the subset.

---

HRecord[i−new]=Record[i−new]&HMAC[Record[i−new]]
HRecord[i+m]=Record[i+m]&HMAC(Record[i+m])
&HMAC(Record[i−new], Record[i+1]...Record[i+m])

---

Sliding Window Implementation Examples

The sliding window processing described herein may be implemented on any number of layers of granularity. For example, a tamper-evident sliding window may be provided that is implemented across one or more audit log(s) associated with a single component, e.g., Application A. In this regard, multiple components may each have an associated tamper evidence adding proxy 18 and a corresponding tamper-evident sliding window instance.

Thus, keeping with the example described with reference to FIGS. 1-3, the first tamper evidence adding proxy 18A may implement a first tamper-evident sliding window, e.g., using the method 100, against one or more logs associated with Application A. Correspondingly, the second tamper evidence adding proxy 18B may implement a second tamper-evident sliding window against one or more logs associated with Application B.

As another illustrative example, a tamper evidence adding proxy 18 may implement a tamper-evident sliding window across multiple logs and/or multiple components. For example, in FIG. 1, the tamper evidence adding proxy 18 may receive audit records from both Application A and Application B. In FIG. 2, the tamper evidence adding proxy 18A may receive audit records from another source (not shown) in addition to receiving audit records from Application A, which correspond to either a single log or multiple logs.

As yet another illustrative example, a tamper evidence adding proxy 18 may implement a tamper-evident sliding window across all logs from all components, e.g., as illustrated in FIG. 1. Still further, a tamper evidence adding proxy 18 may implement a tamper-evident sliding window across a subset of logs from a corresponding subset of components. Still further, a tamper evidence adding proxies 18 may implement tamper-evident sliding window instances as required based upon desired tamper-evidence requirements. Thus, for example, a tamper-evident sliding window instance may be associated with an audit log of each component that requires tamper-evident detection as required by a specific system requirement. Alternatively, a tamper-evident sliding window may be associated with a subset of components that generate log records that have been determined to require tamper evidence enhancement.

Still further, an audit record generating source may designate only certain generated audit records as requiring tamper evidence information. Thus, a tamper-evident sliding window may be associated with a log intended to include select records that require tamper-evident detection capabilities and other records that do not require tamper proof detection capabilities. As such, a tamper-evident sliding window may be "record selective" with its associated log, e.g., so as to operate on only those records that require tamper proofing. Still further, a tamper-evident sliding window may operate at the level of granularity corresponding to a set of logs that are tagged as requiring tamper-evidence, where not all logs and/or records require tamper-evidence.

As still further examples, the tamper-evident sliding window may be leveraged across one or more logs from the perspective of a data store. As an example, a tamper-evident sliding window may be associated with an entire audit log store, a particular component whose log(s) are stored in a particular data store, a record flagged in a data store that has been identified as requiring tamper-evident detection enhancement, etc.

Still further, as described above, the tamper evidence adding proxy computes a signature over a subset of records, such as by calculating HMAC(Record[i], Record[i+1] . . . Record [i+m]) where m corresponds to the window/subset size. The above computation is merely illustrative and is not intended to be limiting. For example, process may be implemented so as to HMAC over the entire contents of the records or over something derived by some function, $f$, which takes as input the contents of the records, e.g., $f$(HMAC(Record[i] . . . Record[i+m])) or HMAC($f$(Record[i] . . . Record[i+m]) or HMAC($f$(Record[i]) . . . $f$(Record[i+m])), etc.

The tamper evident log records (and corresponding signed windows) may be communicated from the tamper evidence adding proxy to an audit log data store such as a persistent log storage on a storage disk, such as described with reference to FIGS. 1, 2 and/or 3 herein. Window computations and aggregations may be held in memory (including volatile memory if utilized) until the window has been calculated over enough log records to achieve a desired "overlap". The signed window is then written to the persistent log, e.g., appended to the appropriate log record HRecord[i] upon being calculated over a desired number of records or otherwise suitably stored either with the tamper-evident audit records, or elsewhere.

Figure 6:
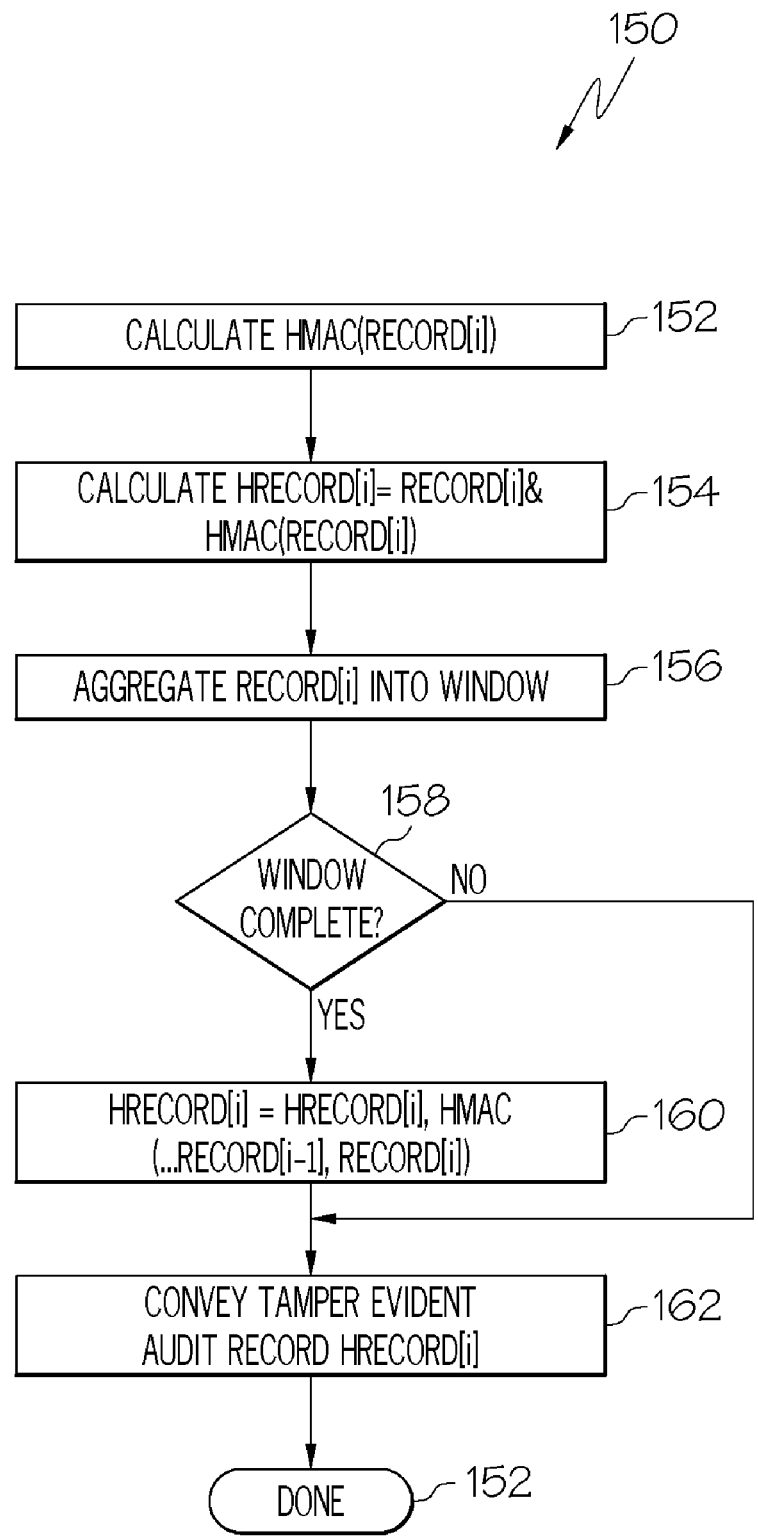
FIG. 6 is a flow chart illustrating a method of implementing signature processing according to various aspects of the present invention.

Referring to FIG. 6, an exemplary method 150 is illustrated for implementing signature processing, such as at 110 in FIG. 4. According to various aspects of the present invention, HMAC(Record[i]) is computed at 152 and HRecord[i] is computed at 154. For example, HRecord[i] may be computed as:

$$H\text{Record}[i]=\text{Record}[i]\&\text{HMAC}[\text{Record}[i]].$$

That is, HRecord[i] is determined by calculating HMAC (Record[i]) and by appending the calculated result to the determined value of Record[i].

This provides a minimal level of tamper protection for Record[i]. That is, at this level, HRecord[i] could potentially be replaced with H'Record[i] and there may not be a record of such a replacement.

As such, HRecord[i] is aggregated into a corresponding window at 156 as described in greater detail herein. A check is made at 158 to determine if the window is full/complete. That is, the window is defined to accumulate a predetermined number of audit records into a subset. In the above example, it was assumed that the first record in the window subset was Record[i] and that there was to be m records in the subset. If the current record being processed is Record[i+m], i.e., the last record in the subset, the window is complete. If the window is full/complete, a signature of the records aggregated into the window is added to the tamper evident record at 160. The window may also be reset as described more fully herein.

$$H\text{Record}[i]=\text{Record}[i]\&\text{HMAC}[\text{Record}[i]]\&\text{HMAC} \\ (\text{Record}[i], \text{Record}[i+1] \ldots \text{Record}[i+m])$$

The tamper evident record is conveyed at 162 to an audit log storage/data store and processing concludes at 164.

Figure 7:
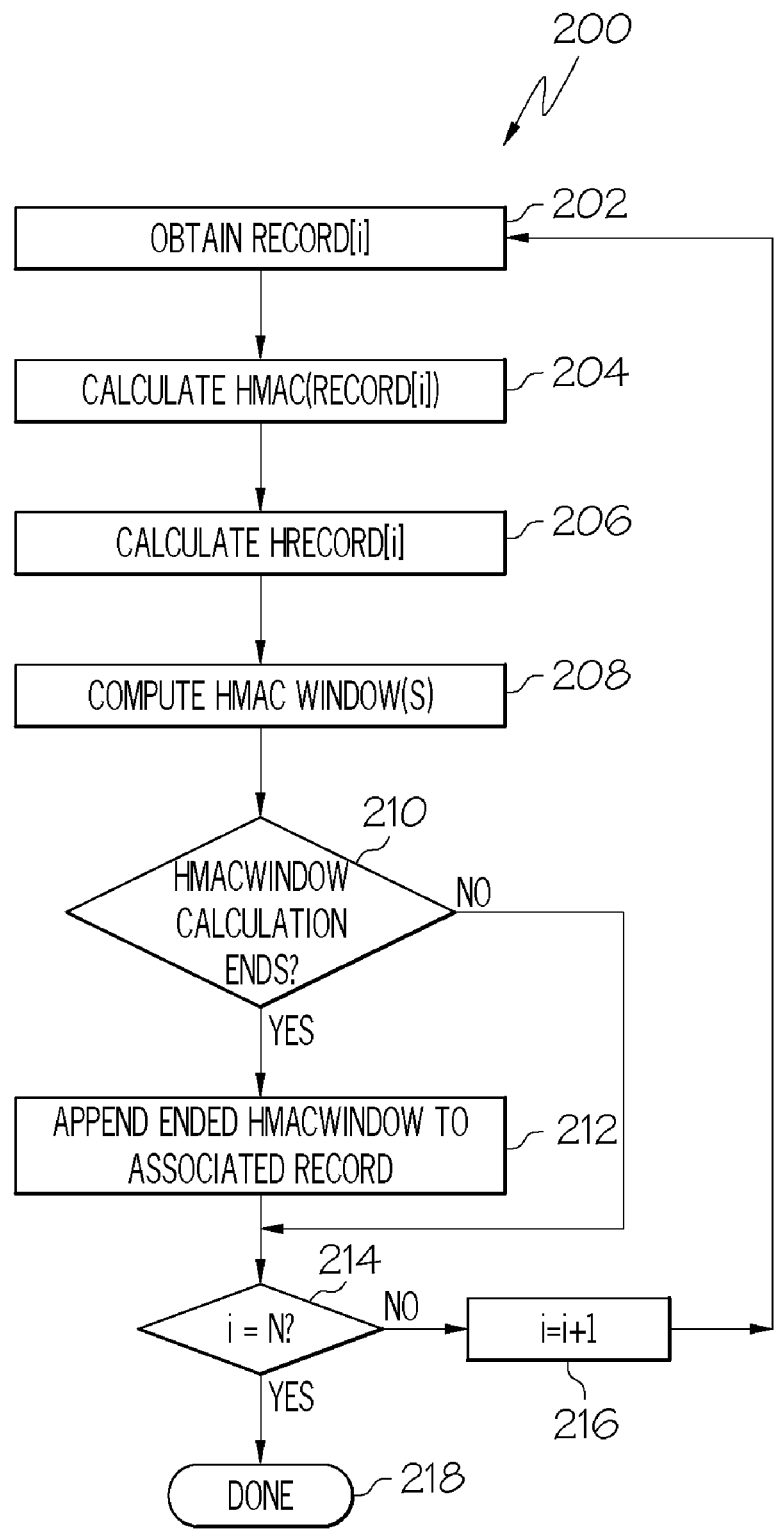
FIG. 7 is a flow chart illustrating a method of implementing signature processing according to yet other aspects of the present invention.

Referring to FIG. 7, an alternative method 200 is illustrated for implementing signature processing at 110 in FIG. 4. The method comprises obtaining Record[i] at 202. The processing in FIG. 7 is completed over a set of records, e.g., for i from 0 to N. In this regard, the process may implement a loop, such as when processing a batch of records. Alternatively the processing described with reference to FIG. 7 may be implemented over time, e.g., as records pass through the tamper evidence adding proxy. For example, by holding the records accumulated into Window1 and Window2 in memory as records pass through, the process does not need to loop over the records. Thus, the tamper evidence adding proxy may process the records as they come in and flow out as tamper evident records destined for a corresponding audit log data store.

As such tamper evidence processing according to various aspects of the present invention may encompass, for example, the case of log records coming in via some stream to an intercepting proxy or a process going through an already created set of log records that it is reading from a file within some read-record loop.

HMAC(Record[i]) is computed at 204 and HRecord[i] is computed at 206. For example, HRecord[i] may be computed as:

$$H\text{Record}[i]=\text{Record}[i]\&\text{HMAC}[\text{Record}[i]]$$

That is, HRecord[i] is determined by calculating HMAC (Record[i]) and by appending the calculated result to the determined value of Record[i]. This allows each record to be checked for tampering, as noted in greater detail herein.

Further, at least two running window HMACs are maintained at 208. For example, two HMAC windows, such as Window1 and Window2 may be computed, each over its finite sets of records with at least one record overlap across subsets of audit records. In this context, a computation may be implemented on one of the windows, and there may be no data values to compute for one or more remaining windows, such as where the audit record being processed is not part of the window. In that arrangement, the computation is conceptual and no actual computation need be performed.

In this way, the processing does not need to re-calculate a HMAC over the entire contents of the log if a portion of the log is updated. Rather, the HMAC need only be recalculated across those "window" calculation(s) associated with the updated, inserted, etc. record.

The window computations are periodically written as well, e.g., to the audit log data store. For example, each window may be appended to a tamper evidence modified record that is written to the audit log data store. After writing a window to the audit log data store, the calculation of the window is restarted. Examples of writing the Window to the audit log are described in greater detail herein.

As an illustrative example, the HMACs may be calculated by computing:

HWindow1 = HMAC(Record[0] + Record[1] + ... + Record[n])
    where 0 < n < N;
HWindow2 = HMAC(Record[i] + Record[i+1] + ... + Record[j])
    where 0 < i < n and n < j < N In an exemplary implementation, i=n−1 may be chosen and j may be selected as some value n greater than i.

HWindow1 = HMAC(Record[n+1] + Record[n+2] + ... + Record[m])
where 0 < n < m <=N.

The pattern for computing HWindow1 and HWindow2 continues until j=m=N.

A check is made at 210 to determine if records can be identified where HWindow1 or HWindow2 calculation ends. If a determination is made that either a HWindow1 or HWindow2 calculation ends, that HMAC calculation is appended to the associated Record at 212. A check is made at 214 to determine if all records have been processed. If all records have not been processed, the next sequential record is selected at 216 and the above process continues to loop. Otherwise, the process concludes at 218.

The sliding windows allow HMAC calculations to pick up from whatever point in the set of records is convenient, without having to re-start the calculation from the beginning of the file. If a calculation is found not to test correctly, backtracking can be done to find where the first failure occurs.

Also, since the HWindow1, HWindow2, etc., calculations span across records and also across one another, no records can be inserted or deleted without the HMAC value being different (with high probability). Accordingly, record insertion and/or deletion may be detected.

According to various aspects of the present invention, the HMAC calculations described herein may be replaced with another appropriate cryptographic signature algorithm. As an example, a public/private key-based digital signature could also be employed. As such, HMAC is shown by way of illustration and not by way of limitation. However, HMACs are typically considered to be less computationally intensive to calculate than public/private key digital signatures.

EXAMPLE

According to further aspects of the present invention, another illustrative example is provided, for computing a sliding window that is four records long, having an overlap of two records.

In general, tamper evidence processing may be implemented by the shorthand flow as follows:

Generate initial header record, designated Record[0].
Compute HWindow1=HMAC(Record[0]) - preserve in memory
Write HRecord[0]=Record[0]&HMAC(Record[0]) to the audit log
Obtain Record[1]
Compute HWindow1=HMAC(Record[0], Record[1])
Write HRecord[1]=Record[1]&HMAC(Record[1])
Obtain Record[2]
Compute HWindow1=HMAC(Record[0] + Record[1] + Record[2])
Compute HWindow2=HMAC(Record[2])
Write HRecord[2]=Record[2]&HMAC(Record[2])
Obtain Record[3]
Compute HWindow1=HMAC(Record[0] + Record[1] + Record[2] + Record[3])
Compute HWindow2=HMAC(Record[2] + Record[3])
Write HRecord[3]=Record[3]&HMAC(Record[3])&HWindow1
Reset HWindow1 to an empty subset
Obtain Record[4]
Compute HWindow1=HMAC(Record[4])
Compute HWindow2=HMAC(Record[2] + Record[3] + Record[4])
Write HRecord[4]=Record[4]&HMAC(Record[4])
Obtain Record[5]

-continued

Compute HWindow1=HMAC(Record[4] + Record[5])
Compute HWindow2=HMAC(Record[2] + Record[3]+ Record[4] + Record[5])
Write HRecord[5]=Record[5]&HMAC(Record[5])&HWindow2
Reset HWindow2 to an empty subset
Continue ....

To guard against records being added before Record[0] or after Record[N], data can be added to the file/log to signify the beginning or ending of the log (or, in this case, log segment) and making sure the signature calculations are performed over both of these markers.

According to various aspects of the present invention, to allow audit record and/or file modification, the signatures of each of the subsets may be stored outside of the signature calculations over the individual audit records. In the examples above, the subset/window signatures were stored in the same audit log data storage over which the overlapping signatures are calculated. However, this need not be the case. The subset/window signatures can be stored in a separate data store or in any manner in which the subsequent processes can retrieve the signatures for audit record editing and/or tamper evidence monitoring. This is a design/implementation choice.

To concatenate two separate logs into one log, e.g., as described with reference to FIG. 3, the ending marker of the first log/file and the beginning marker of the second log/file would be removed, and then the overlapping signatures which would be affected by the change in the file must be re-calculated and stored. It is expected that the entity making these changes does have access to the cryptographic keys necessary to correctly calculate the modified signatures.

To add/modify/remove one or more records from a log, an entity in possession of the correct cryptographic keys would use a similar approach/algorithm. For example, one or more audit records may be modified e.g., modify the Record[i] to Record[i]' as appropriate, and then update the signatures which included Record[i] in their calculation. As such, both an audit log and individual audit records are made to be tamper-evident while still allowing for legitimate updates, edits and other modifications, appended, or pruned without requiring re-calculation of signatures over the entire audit log file. An analogous approach may also be used to add or remove one or more records from a selected subset (chain) of records.

Figure 8:
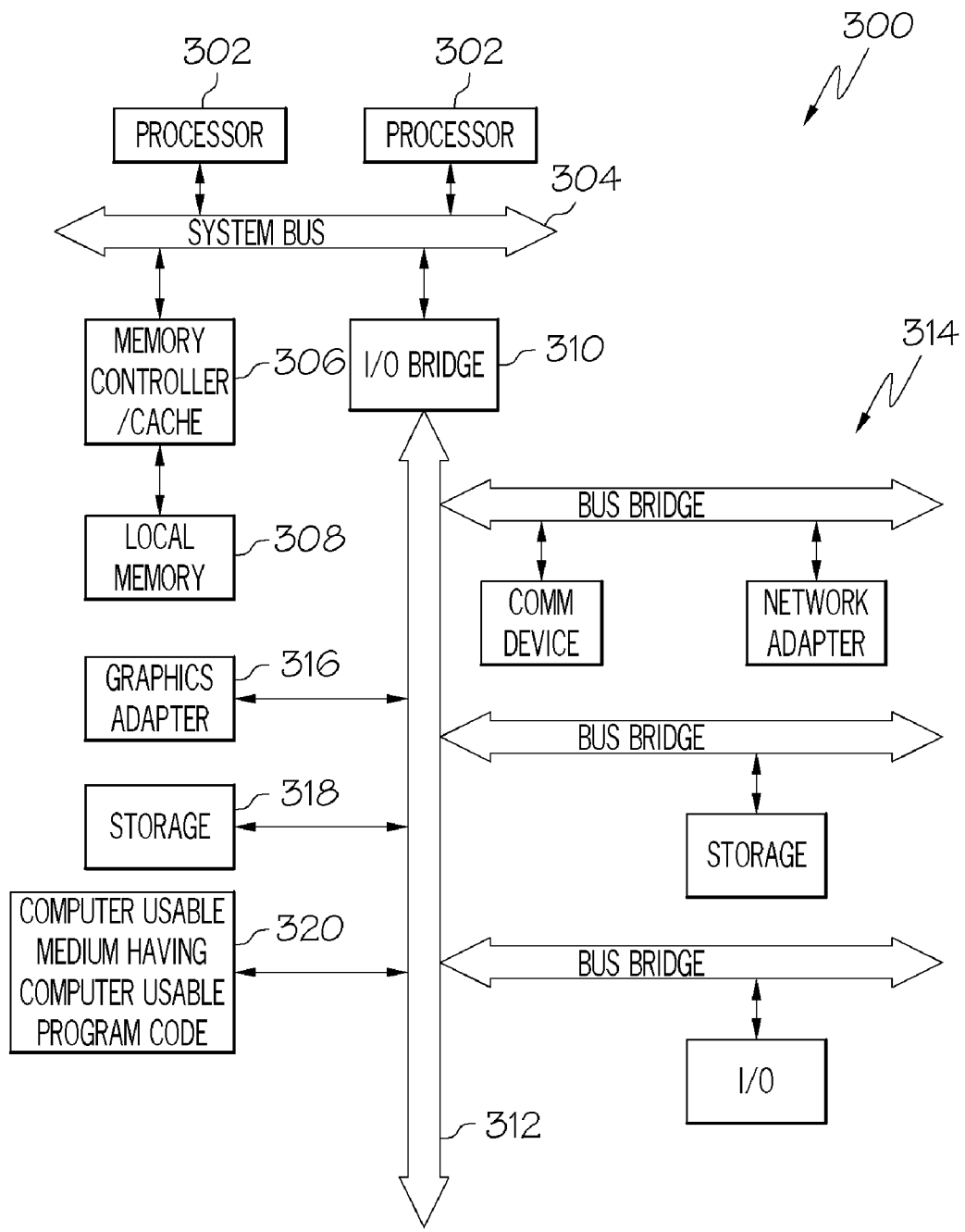
FIG. 8 is a block diagram of an exemplary computer system including a computer usable medium having computer usable program code embodied therewith, where the exemplary computer system is capable of executing a computer program product to provide support of tamper detection for data such as a log of records or to implement aspects of tamper detection according to various aspects of the present invention set out in greater detail herein.

Referring to FIG. 8, a block diagram of a data processing system is depicted in accordance with the present invention. Data processing system 300, such as one of the processing devices described herein, may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bridge 310 is connected to the system bus 304 and provides an interface to an I/O bus 312. The I/O bus may be utilized to support one or more buses 314 and corresponding devices, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to execute any aspect of the present invention, for example, to implement aspect of any of the methods and/or system components illustrated in FIGS. 1-7. Moreover, the computer usable program code may be utilized to implement various aspects of tamper evidence log processing as set out further herein.

The data processing system depicted in FIG. 8 may be, for example, an IBM System P® system, a product of International Business Machines Corporation in Armonk, N.Y., running the Advanced Interactive Executive (AIX®) operating system. An object oriented programming system such as Java may run in conjunction with the operating system and provides calls to the operating system from Java® programs or applications executing on a data processing system. ("System p" and "AIX" are registered trademarks of International Business Machines Corporation in the United States, other countries, or both, and "Java" is a registered trademark of Sun Microsystems, Inc. in the United States, other countries, or both.)

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of supporting tamper detection of audit log information within a computing system, comprising:
    configuring a tamper evidence adding proxy for adding tamper evidence information to audit information to provide tamper evident audit records by:
        obtaining electronically communicated audit records from at least one audit record generating source;
        grouping obtained audit records into subsets of audit records, each subset comprising at least two sequentially-occurring ones of the audit records;
        providing tamper evidence processing to the subsets of audit records utilizing a cryptographic mechanism to calculate, over each of the subsets of audit records, a digital signature using a corresponding signature definition so as to create an overlapping chain of digitally signed audit records, wherein each of the subsets of audit records contains at least one designated carry-over audit record that overlaps into a next one of the subsets such that each carryover audit record is associated with at least two of the subsets and therefore with a corresponding number of the digital signatures computed over the subsets;
        forwarding the tamper evident audit records from the tamper evidence adding proxy to a corresponding audit log storage subsystem for storage; and
        storing the calculated digital signatures; and
    performing tamper monitoring by:
        retrieving an audit record of interest from the audit log storage subsystem;
        retrieving all audit records in an associated subset of audit records corresponding to the audit record of interest;
        retrieving the digital signature associated with the retrieved subset of audit records;
        signing the retrieved subset of audit records using the corresponding signature definition;
        comparing a result of signing the retrieved subset with the retrieved digital signature; and
        conveying whether tampering has been evidenced based upon the comparison.

2. The method according to claim 1, wherein the providing comprises:
    defining each digital signature as a hash calculation encrypted using a corresponding shared secret key.

3. The method according to claim 1, wherein obtaining electronically communicated audit records from at least one audit record generating source comprises:
    obtaining electronically communicated audit records for tamper evidence processing across at least one audit log associated with at least one audit record generating source.

4. The method according to claim 1, wherein obtaining electronically communicated audit records from at least one audit record generating source comprises:
    obtaining only electronically communicated audit records for tamper evidence processing that are tagged as requiring tamper-evidencing, where not all audit records require tamper-evidencing.

5. The method according to claim 1, wherein the providing further comprises:
    generating at least one of a header and/or a footer for the overlapping chain of audit records.

6. The method according to claim 1, wherein grouping obtained audit records into subsets of audit records further comprises:
    defining a window size corresponding to a number of the sequentially-occurring audit records in each full subset, wherein the window size comprises one of: a static window size, a dynamically changeable window size, and a variable window size.

7. The method according to claim 1, further comprising appending the digital signature calculated over each subset of audit records to a last of the tamper evident audit records associated with the subset.

8. The method according to claim 1, wherein forwarding the tamper evident audit records from the proxy to a corresponding audit log storage subsystem for storage comprises:

generating each tamper evident audit record by computing a signature across each obtained audit record and by appending the computed signature to that obtained audit record.

9. The method according to claim 1, further comprising performing an authorized modification of a subset of audit records by:
obtaining a selected audit record to be modified;
modifying the selected audit record by performing at least one of: an addition of at least one audit record, a deletion of at least one audit record, and a modification of at least one audit record;
updating the digital signature calculated over each of the subsets of audit records associated with the selected record; and
forwarding the modified tamper evident audit records to the audit log storage system for storage.

10. The method according to claim 1, further comprising:
defining at least a first sliding window and a second sliding window;
defining a first window size corresponding to a number of audit records associated with the first sliding window;
defining a second window size corresponding to a number of audit records associated with the second sliding window; and
defining a window overlap corresponding to a number of audit records of overlap between the first and second sliding windows so as to characterize at least in part, a pattern between the first sliding window and the second sliding window; wherein:
providing tamper evidence processing to the subsets of audit records utilizing a cryptographic mechanism to calculate, over each of the subsets of audit records, a digital signature so as to create an overlapping chain of digitally signed audit records comprises:
obtaining over time, a plurality of audit records and sequentially processing each obtained audit record by:
indexing the obtained audit record as a next sequential audit record for processing;
generating an associated tamper evident audit record by computing a signature across the next sequential audit record and appending the computed signature to the next sequential audit record;
associating the obtained audit record with the first window if the index associated with the next sequential audit record corresponds to the first window based upon the pattern;
associating the obtained audit record with the second window if the index associated with the next sequential audit record corresponds to the second window based upon the pattern, such that if the index associated with the next sequential audit record corresponds to the defined window overlap, that next sequential audit record is associated with both the first and second window;
storing a cryptographic signature computed across an entirety of an associated subset of audit records corresponding to the first window if the first window is full, whereupon the first window is then reset; and
storing a cryptographic signature computed across an entirety of an associated subset of audit records corresponding to the second window if the second window is full, whereupon the second window is then reset.

11. A computer program product for supporting tamper detection of audit log information within a computing system, comprising:
a non-transitory computer usable medium having computer usable program code embodied therewith, the computer usable program code comprising:
computer usable program code configured to implement a tamper evidence adding proxy for adding tamper evidence information to audit information to provide tamper evident audit records, the computer usable program code having:
computer usable program code configured to obtain electronically communicated audit records from at least one audit record generating source;
computer usable program code configured to group obtained audit records into subsets of audit records, each subset comprising at least two sequentially-occurring ones of the audit records;
computer usable program code configured to provide tamper evidence processing to the subsets of audit records utilizing a cryptographic mechanism to calculate, over each of the subsets of audit records, a digital signature using a corresponding signature definition so as to create an overlapping chain of digitally signed audit records, wherein:
each of the subsets of audit records contains at least one designated carryover audit record that overlaps into a next one of the subsets such that each carryover audit record is associated with at least two of the subsets and therefore with a corresponding number of the digital signatures computed over the subsets;
computer usable program code configured to forward the tamper evident audit records from the tamper evidence adding proxy to a corresponding audit log storage subsystem for storage; and
computer usable program code configured to store the calculated digital signatures; and
computer usable program code configured to perform tamper monitoring having:
computer usable program code configured to retrieve an audit record of interest from the audit log storage subsystem;
computer usable program code configured to retrieve all audit records in an associated subset of audit records corresponding to the audit record of interest;
computer usable program code configured to retrieve the digital signature associated with the retrieved subset of audit records;
computer usable program code configured to sign the retrieved subset of audit records using the corresponding signature definition;
computer usable program code configured to compare a result of signing the retrieved subset with the retrieved digital signature; and
computer usable program code configured to convey whether tampering has been evidenced based upon the comparison.

12. The computer program product according to claim 11, wherein the computer usable program code configured to provide tamper evidence processing comprises:
computer usable program code configured to define each digital signature as a hash calculation encrypted using a corresponding shared secret key.

13. The computer program product according to claim 11, wherein the computer usable program code configured to obtain electronically communicated audit records from at least one audit record generating source comprises:
computer usable program code configured to obtain electronically communicated audit records for tamper evidence processing across at least one audit log associated with at least one audit record generating source.

14. The computer program product according to claim 11, wherein the computer usable program code configured to obtain electronically communicated audit records from at least one audit record generating source comprises:
  computer usable program code configured to obtain only electronically communicated audit records for tamper evidence processing that are tagged as requiring tamper-evidencing, where not all audit records require tamper-evidencing.

15. The computer program product according to claim 11, wherein the computer usable program code configured to provide tamper evidence processing further comprises:
  computer usable program code configured to generate at least one of a header and/or a footer for the overlapping chain of audit records.

16. The computer program product according to claim 11, wherein the computer usable program code configured to group obtained audit records into subsets of audit records further comprises:
  computer usable program code configured to define a window size corresponding to a number of the sequentially-occurring audit records in each full subset, wherein the window size comprises one of: a static window size, a dynamically changeable window size, and a variable window size.

17. The computer program product according to claim 11, wherein the computer usable program code configured to forward the tamper evident audit records from the proxy to a corresponding audit log storage subsystem for storage comprises:
  computer usable program code configured to generate each tamper evident audit record by computing a signature across each obtained audit record and by appending the computed signature to that obtained audit record.

18. The computer program product according to claim 11, further comprising computer usable program code configured to perform an authorized modification of a subset of audit records having:
  computer usable program code configured to obtain a selected audit record to be modified;
  computer usable program code configured to modify the selected audit record by performing at least one of: an addition of at least one audit record, a deletion of at least one audit record, and a modification of at least one audit record;
  computer usable program code configured to update the digital signature calculated over each of the subsets of audit records associated with the selected record; and
  computer usable program code configured to forward the modified tamper evident audit records to the audit log storage system for storage.

19. The computer program product according to claim 11, further comprising:
  computer usable program code configured to define at least a first sliding window and a second sliding window;
  computer usable program code configured to define a first window size corresponding to a number of audit records associated with the first sliding window;
  computer usable program code configured to define a second window size corresponding to a number of audit records associated with the second sliding window; and
  computer usable program code configured to define a window overlap corresponding to a number of audit records of overlap between the first and second sliding windows so as to characterize at least in part, a pattern between the first sliding window and the second sliding window; wherein:
  computer usable program code configured to provide tamper evidence processing to the subsets of audit records utilizing a cryptographic mechanism to calculate, over each of the subsets of audit records, a digital signature so as to create an overlapping chain of digitally signed audit records comprises:
  computer usable program code configured to obtain over time, a plurality of audit records and sequentially processing each obtained audit record by:
    computer usable program code configured to index the obtained audit record as a next sequential audit record for processing;
    computer usable program code configured to generate an associated tamper evident audit record by computing a signature across the next sequential audit record and appending the computed signature to the next sequential audit record;
    computer usable program code configured to associate the obtained audit record with the first window if the index associated with the next sequential audit record corresponds to the first window based upon the pattern;
    computer usable program code configured to associate the obtained audit record with the second window if the if the index associated with the next sequential audit record corresponds to the second window based upon the pattern, such that if the index associated with the next sequential audit record corresponds to the defined window overlap, that next sequential audit record is associated with both the first and second window;
    computer usable program code configured to store a cryptographic signature computed across an entirety of an associated subset of audit records corresponding to the first window if the first window is full, whereupon the first window is then reset; and
    computer usable program code configured to store a cryptographic signature computed across an entirety of an associated subset of audit records corresponding to the second window if the second window is full, whereupon the second window is then reset.

20. A system to support tamper detection of audit log information within a computing system comprising:
  a processor;
  a memory device;
  program code resident in said memory device, said program code executable by said processor to run a tamper evidence adding proxy configured to wrapper at least one component within an existing audit log processing system for adding tamper evidence information to audit information to provide tamper evident audit records, by:
    obtaining electronically communicated audit records from at least one audit record generating source;
    grouping obtained audit records into subsets of audit records, each subset comprising at least two sequentially-occurring ones of the audit records;
    providing tamper evidence processing to the subsets of audit records utilizing a cryptographic mechanism to calculate, over each of the subsets of audit records, a digital signature using a corresponding signature definition so as to create an overlapping chain of digitally signed audit records, wherein:
      each of the subsets of audit records contains at least one designated carryover audit record that overlaps into a next one of the subsets such that each carryover audit record is associated with at least two of the subsets and therefore with a corresponding number of the digital signatures computed over the subsets;

forwarding the tamper evident audit records from the tamper evidence adding proxy to a corresponding audit log storage subsystem for storage; and storing the calculated digital signatures; and performing tamper monitoring by:
- retrieving an audit record of interest from the audit log storage subsystem;
- retrieving all audit records in an associated subset of audit records corresponding to the audit record of interest;
- retrieving the digital signature associated with the retrieved subset of audit records;
- signing the retrieved subset of audit records using the corresponding signature definition;
- comparing a result of signing the retrieved subset with the retrieved digital signature; and
- conveying whether tampering has been evidenced based upon the comparison.

\* \* \* \* \*